US008816598B2

(12) United States Patent
Dilger

(10) Patent No.: US 8,816,598 B2
(45) Date of Patent: Aug. 26, 2014

(54) CIRCUIT AND METHOD FOR DRIVING A LUMINOUS MEANS

(75) Inventor: Richard Dilger, Munich (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 614 days.

(21) Appl. No.: 12/986,222

(22) Filed: Jan. 7, 2011

(65) Prior Publication Data

US 2011/0199017 A1    Aug. 18, 2011

(30) Foreign Application Priority Data

Feb. 15, 2010   (DE) .................... 10 2010 001 919

(51) Int. Cl.
| | |
|---|---|
| G05F 1/00 | (2006.01) |
| H05B 37/02 | (2006.01) |
| H05B 39/04 | (2006.01) |
| H05B 41/36 | (2006.01) |
| H05B 39/02 | (2006.01) |

(52) U.S. Cl.
USPC ........................................ 315/291; 315/209 R

(58) Field of Classification Search
None
See application file for complete search history.

(56) References Cited

U.S. PATENT DOCUMENTS

| | | | |
|---|---|---|---|
| 4,017,785 A | | 4/1977 | Perper |
| 2008/0284346 A1* | | 11/2008 | Lee .................. 315/224 |
| 2009/0121658 A1 | | 5/2009 | Steffen et al. |
| 2009/0315477 A1 | | 12/2009 | Kinsella |

FOREIGN PATENT DOCUMENTS

| | | |
|---|---|---|
| CN | 2534766 Y | 2/2009 |
| CN | 101420804 A | 4/2009 |
| FR | EP0183597 A1 * | 6/1986 |
| WO | 2008093692 A1 | 8/2008 |
| WO | 2010054523 A1 | 5/2010 |
| WO | 2010/091707 A1 | 8/2010 |
| WO | 2011111005 A1 | 9/2011 |

OTHER PUBLICATIONS

English language abstract for EP 0183597 A1.
English language abstract of DE102005011503B3.
Office Action in the parallel Chinese patent application dated Mar. 12, 2014 with English translation.

* cited by examiner

*Primary Examiner* — Douglas W Owens
*Assistant Examiner* — Dedei K Hammond

(57) ABSTRACT

A circuit for driving a luminous means is provided. The circuit may include a driver circuit having an input and an output, wherein the output of the driver circuit is connected to the luminous means; and a detector circuit, on the basis of which, depending on an input signal of the driver circuit, a capacitor can be connected to the output of the driver circuit or to the input of the driver circuit.

18 Claims, 2 Drawing Sheets

CIRCUIT AND METHOD FOR DRIVING A LUMINOUS MEANS

CROSS-REFERENCE TO RELATED APPLICATION

This application claims priority to German Patent Application Serial No. 10 2010 001 919.4, which was filed Feb. 15, 2010, and is incorporated herein by reference in its entirety.

TECHNICAL FIELD

Various embodiments relate to a circuit for driving a luminous means, and to a corresponding method. Furthermore, a luminaire or a lamp including such a circuit is proposed.

BACKGROUND

In known drivers for driving light emitting diodes (LEDs), a capacitor having a large capacitance (e.g. in the range of 1 mF to 10 mF) is arranged in parallel with the output. Therefore, even during an inactive phase of the driver, that is to say in the vicinity of the zero crossing, enough energy is made available for the LEDs, such that the latter scarcely perceptively flicker.

What is disadvantageous in this case, however, is that, as a result of the forward voltage of the LEDs, only a portion of the energy stored in the capacitor can be utilized and, consequently, the required capacitance is very high.

SUMMARY

A circuit for driving a luminous means is provided. The circuit may include a driver circuit having an input and an output, wherein the output of the driver circuit is connected to the luminous means; and a detector circuit, on the basis of which, depending on an input signal of the driver circuit, a capacitor can be connected to the output of the driver circuit or to the input of the driver circuit.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
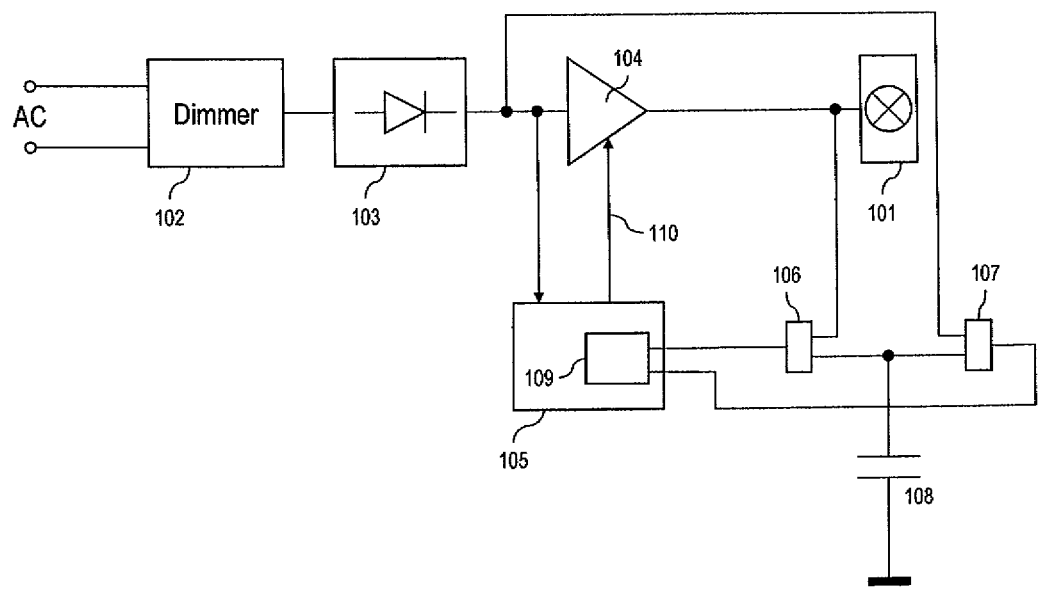
FIG. 1 shows a schematic block diagram of a circuit for driving a luminous means.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various embodiments avoid the abovementioned disadvantage and specify a solution which permits, for example, an efficient brightness regulation (dimming) of a luminous means, in which case, even in the brightness-regulated state, flicker is not perceptible to the human eye. In this case, for example, the capacitance of the capacitor used at the output of the driver is intended to be significantly reduced.

Various embodiments provide a circuit for driving a luminous means. The circuit may include a driver circuit having an input and an output, wherein the output of the driver circuit is connected to the luminous means, and a detector circuit, on the basis of which, depending on an input signal of the driver circuit, a capacitor can be connected to the output of the driver circuit or to the input of the driver circuit.

In various embodiments, the capacitor may be at least one capacitor.

This solution may enable brightness regulation (dimming) for at least one semiconductor luminous element, e.g. for at least one light-emitting diode (LED) in the range of a low alternating voltage. The dimming of the LED may be effected such that the human eye perceives no flicker. Furthermore, the proposed solution also functions in conjunction with phase-gating and/or phase-chopping dimmers.

The proposed circuit can be operated from electronic transformers since it may have a largely resistive behavior at the input. It may also be advantageous that the proposed solution permits the use of a capacitor which is an order of magnitude smaller and which correspondingly takes up significantly less structural space.

In one development, the driver circuit has a switching regulator or a step-up converter (boost converter), e.g. an SEPIC converter.

In various embodiments, the driver circuit may include a boost switching regulator.

In another development, the detector circuit connects the capacitor to the output of the driver circuit or to the input of the driver circuit by means of two controllable electronic switches.

In various embodiments, the electronic switch includes one of the following components: a semiconductor switch, a transistor, a field effect transistor, a MOSFET, a BiCMOS switch, and/or an IGBT.

Moreover, in various embodiments, the capacitor is a ceramic capacitor. Such a ceramic capacitor requires significantly less structural space than the capacitors in conventional solutions.

Furthermore, in various embodiments, the capacitor may be connected to the input of the driver circuit during a pause of the input signal of the driver circuit.

The pause of the input signal may be an input signal which is lower than a predefined threshold value. By way of example, a pause of the input signal can be present when a dimmer carries out a phase-gating control and/or a phase-chopping control and temporarily switches off the input signal in order to reduce the brightness of the luminous means.

In the context of an additional development, the capacitor may be connected to the input of the driver circuit during the pause of the input signal of the driver circuit for a predefined time duration, in particular around the middle of the pause.

What may be achieved by the activation during the middle of the pause or during a time period around the middle of the pause is that the length of the pause is significantly shortened and the remaining significantly shorter pauses during which the luminous means is not driven (is dark) are not perceived as flicker by the human eye.

A next development consists in the fact that the duration of the pause may be determined with the aid of the detector circuit.

By way of example, a pause occurring for the first time may be determined (if appropriate also a plurality of pauses) and the switches may thereupon be correspondingly driven for connecting the capacitor to the input of the driver or respectively the output of the driver.

In various embodiments, the detector circuit drives a modulation of the driver. For this purpose, the detector circuit may have a control line to the driver and drive or set the modulation, e.g. average output power or gain of the driver. It is thereby possible for the detector circuit to correct the average power output by the driver downward during dimming, that is to say during the shortening of the pauses in which the capacitor is at least temporarily connected to the input of the driver.

An alternative embodiment consists in the fact that the detector circuit reduces the modulation of the driver if the capacitor is connected to the input of the driver circuit. This enables the brightness of the luminous means to be reduced and simultaneously prevents flicker of the luminous means from being perceptible.

In a next configuration, the input of the driver is connected to the output of a rectifier and, for example, a dimmer is connected upstream of the rectifier. Consequently, an AC voltage is set by means of the dimmer, and converted into a (pulsating and/or smoothed) DC voltage with the aid of the rectifier, and the luminous means is correspondingly operated by means of the driver.

Moreover, in various embodiments, the luminous means includes at least one semiconductor luminous element, e.g. at least one light-emitting diode.

In various embodiments, the luminous means may include a series circuit composed of a plurality of semiconductor luminous elements or LEDs and/or a parallel circuit composed of a plurality of semiconductor luminous elements or LEDs.

Various embodiments furthermore provide a method for driving a luminous means, wherein a driver circuit has an input and an output, wherein the output of the driver circuit is connected to the luminous means, wherein a capacitor is connected to the output of the driver circuit or to the input of the driver circuit depending on an input signal of the driver circuit.

In various embodiments, switches may be driven correspondingly, such that the capacitor is connected alternately either to the input or to the output of the driver.

One configuration consists in the fact that a pause of the input signal of the driver circuit is detected, and the capacitor is connected to the input of the driver circuit at least temporarily during the pause, e.g. around the middle of the pause.

Various embodiments also provide a luminaire or a lamp including a circuit as described herein.

A circuit arrangement is proposed having a detector circuit for detecting a low input voltage, that is to say that the detector circuit is used to ascertain when an input voltage is lower than a predefined value. In this case, the detector circuit may be embodied in analog fashion and also digitally.

The circuit arrangement furthermore includes a driver, e.g. a boost converter or switching regulator, for driving at least one luminous means, e.g. at least one semiconductor luminous element (e.g. at least one LED). In various embodiments, a plurality of LEDs can be connected in series and/or in parallel. On the output side, the driver can have a capacitor for smoothing a non-uniform current form of the driver.

Furthermore, a further (larger) capacitance is provided at the output of the driver, said capacitance being drivable via the detector circuit by means of two electronic switches, e.g. transistors, MOSFETS, etc., in such a way that said capacitance is connected either to the output of the driver or to the input of the driver.

By way of example, the changeover of the capacitance may be effected in a pause of the input signal present at the driver, that is to say if no input voltage is present. In various embodiments, the changeover may be effected approximately in the middle or in a temporal range around the middle of the pause.

As a result, the pause, that is to say the time period in which the luminous means is not luminous, can be approximately halved. If luminous emission with low brightness (high degree of dimming) is desired, a phase-cutting control (phase-gating and/or phase-chopping control) in conventional dimmers provides an interruption of the luminous duration, and the alternating sections of activated and inactive luminous means are perceived as flicker by the human eye given a sufficiently long pause. As a result of the changeover of the capacitor to the input of the driver approximately in the middle of the interruption, the capacitor supplies electrical energy (e.g. in the middle) in the pause to the driver, and flicker of the luminous means, e.g. of the at least one LED, at approximately double the frequency is no longer perceptible by the human eye.

Consequently, it is possible e.g. to double the rectified power supply frequency in the state of brightness regulation and the luminous means: the (pulsating) rectified power supply frequency has e.g. a frequency of 100 Hz to 120 Hz and hence 200 Hz to 240 Hz after frequency doubling. Such high-frequency switching of the luminous means is not perceptible by the human eye even in the case of luminous means, such as LEDs, which switch largely without any delay.

One option consists in the fact that the detector circuit drives the driver, such that a correspondingly average power of the driver is withdrawn even in the brightness-reduced operation mode (e.g. in the case of a high degree of dimming). This prevents the feedback of the energy of the capacitor to the input of the driver from increasing the brightness of the luminous means and thus counteracting the brightness reduction actually desired on account of the dimming. Consequently, the output power of the driver may also be reduced depending on the connection of the capacitor to the input by means of a corresponding drive signal and the detector circuit. As a result, although power of the capacitor is fed back to the input of the driver, the driver itself is correspondingly limited, such that the average power decreases, that is to say that the luminous means is luminous less brightly, but flicker is nevertheless not perceptible on account of the effect explained here.

A further option is that the detector circuit includes a delay element or is connected to such a delay element (if appropriate embodied separately). What can be achieved on the basis of the delay element is that the pause at the input of the driver is utilized in a targeted manner in such a way that the capacitor is connected to the input of the driver at a predefined point in time, e.g. for a predefined time duration, around the middle of the pause. For this purpose, the detector circuit may determine the duration of the pause and, with the aid of the delay element, the capacitor may be connected to the input of the driver for the corresponding time duration around the middle of the pause.

FIG. 1 shows a schematic block diagram of a circuit for driving a luminous means 101, wherein the luminous means 101 in various embodiments has at least one LED.

An AC voltage feeds a dimmer 102, which is connected to a driver 104 via rectifier 103. The driver 104 may be a boost converter, e.g. an SEPIC converter. The luminous means 101 is driven via the driver 104.

A detector circuit 105 optionally includes a delay element 109. A capacitor 108 is connected to the output of the driver 104 depending on a switch 106 or to the input of the driver 104 depending on a switch 107. The switches 106 and 107 are driven by the detector circuit 105, e.g. by the delay element 109. The switches 106, 107 may be electronic switches, e.g. transistors, MOSFETS, IGBTs, BiCMOS switches, field effect transistors or similar switches.

The detector circuit 105 is connected to the input of the driver 104 and optionally includes a control line 110 for driving the driver 104.

Depending on a magnitude of a voltage detected at the input of the driver 104, therefore, the detector circuit 105 via the switches 106, 107, may connect the capacitor 108 either to the output or to the input of the driver 104. In various embodiments, a pause, that is to say a duration of an interruption of the drive signal of the driver 104, may be detected by means of the detector circuit 105 and, by means of the delay unit 109, the capacitor 108 may be connected via the switch 107 to the input of the driver 104 for a predefined time duration depending on the length of the pause. In this case, it should be mentioned that the switches 106, 107 are operated alternately, for example, that is to say that either the switch 106 or the switch 107 is closed.

The dimmer 102 may have e.g. a phase-gating control and/or a phase-chopping control: in order to reduce the brightness of the luminous means 101, part of the phase of the AC voltage signal is switched off.

Figure 2:
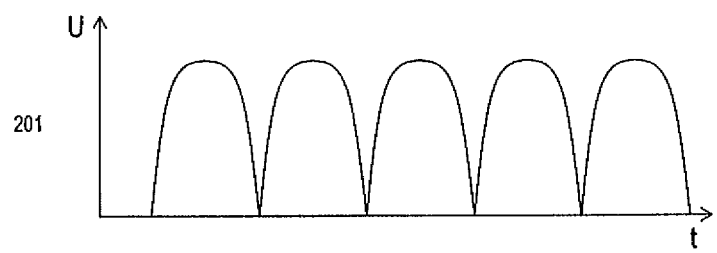
FIG. 2 shows symbolically different temporal profiles of voltage profiles at the output of the rectifier and at the input of the driver.
Figure 2:
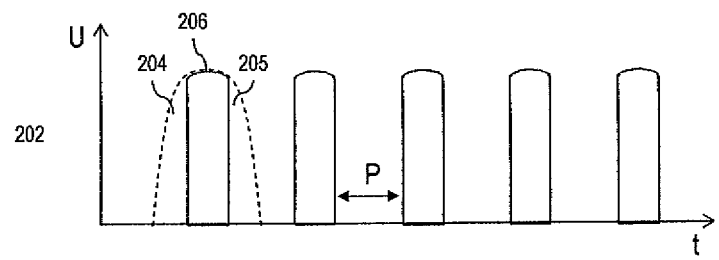
Figure 2:
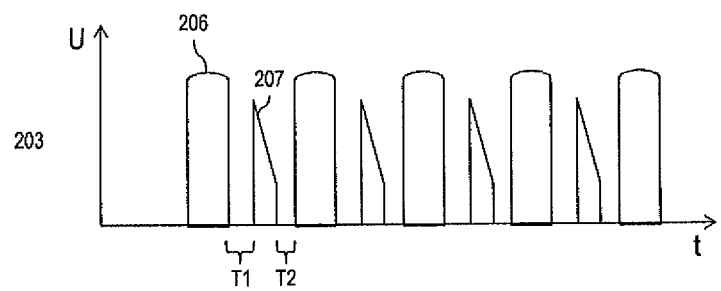

FIG. 2 shows symbolically different temporal profiles of voltage profiles. A voltage profile 201 shows an output signal of the rectifier 103 without the dimmer 102 dimming, i.e. reducing, the brightness of the luminous means 101. The voltage profile 201 corresponds to an (unsmoothed) pulsating DC voltage.

A voltage profile 202 shows a dimmed voltage signal at the output of the rectifier 103, wherein a rising part of the phase 204 and a falling part of the phase 205 have been chopped by the dimmer 102. The brightness of the luminous means 101 thus decreases. However, on account of the phase control of the dimmer 102, pauses P occur in which the luminous means 101 is not driven. As a result of the alternation of driving phases 206 and pauses P, the luminous means 101 flickers perceptively to the human eye.

In this case, it should be noted that the solution explained here also functions only with a phase-gating control or only with a phase-chopping control. Accordingly, the driving phase 206 shown in FIG. 2 should then additionally be supplemented either by the region 205 or by the region 204.

A voltage profile 203 shows the driving phases 206 in accordance with the voltage profile 202, a voltage signal 207 now additionally being present in the pauses P. Said voltage signal 207 is based on the activation of the switch 107 and conducts at least part of the electrical charge stored in the capacitor 108 to the input of the driver 104. The interruptions of the luminous duration are significantly reduced (see in each case the time durations T1, T2 in comparison with the pause P), and the human eye cannot perceive any flicker of the luminous means 101.

With the aid of the control line 110 (see FIG. 1), the detector circuit 105 can drive the driver 104 in such a way that the average electrical power is correspondingly adapted. If, by way of example, the capacitor 108 is connected to the input of the driver 104 by means of the switch 107 for a time duration, then on the one hand flicker is prevented, and on the other hand electrical energy is additionally fed to the luminous means 101, such that the brightness is possibly not reduced sufficiently without a further measure. Therefore, via the control line 110, the modulation of the driver 104 can be reduced, such that the average electrical energy output to the luminous means 101 by the driver 104 is reduced and, consequently, the brightness of the luminous means 101 may be dimmed or attenuated despite additional energy being fed to the input of the driver 104. In various embodiments, there is a lower threshold for the greatest possible dimming (that is to say the lowest settable brightness of the luminous means 101), and then the luminous means 101 is switched off.

The approach presented thus enables an effective brightness regulation, wherein a flicker of the dimmed luminous means cannot be perceived by the human eye even in pauses of the driving. A further advantage is that the energy stored in the capacitor on the output side is utilized more efficiently in that it is passed at least temporarily to the input of the driver. Said capacitor can thus be given dimensions that are a factor of 10 to 20 smaller than in conventional circuits. Consequently, e.g. a ceramic capacitor can be used, which has an advantageous effect on the structural space required.

LIST OF REFERENCE SYMBOLS

101 Luminous means
102 Dimmer
103 Rectifier
104 Driver (circuit)
105 Detector circuit
106 (electronic) Switch
107 (electronic) Switch
108 Capacitor
109 Delay element
110 Control line
201 Voltage profile (pulsating DC voltage)
202 Voltage profile (dimmed voltage signal)
203 Voltage profile (dimmed voltage signal with additional voltage signal 207 within the pause P)
204 Rising phase
205 Falling phase
206 Driving phase
207 Voltage signal
P Pause
T1 Pause
T2 Pause While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit for driving a luminous means, the circuit comprising: a driver circuit having an input and an output, wherein the output of the driver circuit is connected to the luminous means; and a detector circuit, on the basis of which, depending on an input signal of the driver circuit, a capacitor is configured to be connected to the output of the driver circuit or to the input of the driver circuit, wherein the capacitor is configured to be connected to the input of the driver circuit during a pause of the input signal of the driver circuit, wherein the capacitor is configured to be connected to the input of the driver circuit during the pause of the input signal of the driver circuit for a predefined time duration.

2. The circuit as claimed in claim 1, wherein the driver circuit has a switching regulator or a step-up converter.

3. The circuit as claimed in claim 2, wherein the driver circuit has an SEPIC converter.

4. The circuit as claimed in claim 1, wherein the detector circuit connects the capacitor to the output of the driver circuit or to the input of the driver circuit by means of two controllable electronic switches.

5. The circuit as claimed in claim 4, wherein the electronic switch comprises one of the following components: a semiconductor switch, a transistor, a field effect transistor, a MOSFET, a BiCMOS switch, and an IGBT.

6. The circuit as claimed in claim 1, wherein the capacitor is a ceramic capacitor.

7. The circuit as claimed in claim 1, wherein the capacitor is configured to be connected to the input of the driver circuit during the pause of the input signal of the driver circuit around the middle of the pause.

8. The circuit as claimed in claim 1, wherein the duration of the pause is configured to be determined with the aid of the detector circuit.

9. The circuit as claimed in claim 1, wherein the detector circuit drives a modulation of the driver.

10. The circuit as claimed in claim 9, wherein the detector circuit reduces the modulation of the driver if the capacitor is connected to the input of the driver circuit.

11. The circuit as claimed in claim 1, wherein the input of the driver is connected to the output of a rectifier.

12. The circuit as claimed in claim 11, wherein a dimmer is connected upstream of the rectifier.

13. The circuit as claimed in claim 1, wherein the luminous means comprises at least one semiconductor luminous element.

14. The circuit as claimed in claim 13, wherein the luminous means comprises at least one light-emitting diode.

15. A method for driving a luminous means, the method comprising: connecting an output of a driver circuit having an input and the output to the luminous means, and connecting a capacitor to the output of the driver circuit or to the input of the driver circuit depending on an input signal of the driver circuit,
wherein the capacitor is configured to be connected to the input of the driver circuit during a pause of the input signal of the driver circuit,
wherein the capacitor is configured to be connected to the input of the drive circuit during the pause of the input signal of the drive circuit for a predefined time duration.

16. The method as claimed in claim 15, further comprising: detecting a pause of the input signal of the driver circuit, and connecting the capacitor to the input of the driver circuit at least temporarily during the pause.

17. The method as claimed in claim 16, wherein the capacitor is connected to the input of the driver circuit at least temporarily around the middle of the pause.

18. A luminaire or a lamp, comprising: a circuit for driving a luminous means, the circuit comprising: a driver circuit having an input and an output, wherein the output of the driver circuit is connected to the luminous means; and a detector circuit, on the basis of which, depending on an input signal of the driver circuit, a capacitor is configured to be connected to the output of the driver circuit or to the input of the driver circuit,
wherein the capacitor is configured to be connected to the input of the driver circuit during a pause of the input signal of the driver circuit,
wherein the capacitor is configured to be connected to the input of the driver circuit during the pause of the input signal of the driver circuit for a predefined time duration.

* * * * *